United States Patent
Varga et al.

(10) Patent No.: US 10,635,825 B2
(45) Date of Patent: Apr. 28, 2020

(54) DATA PRIVACY AWARENESS IN WORKLOAD PROVISIONING

(71) Applicant: INTERNATIONAL BUSINESS MACHINES CORPORATION, Armonk, NY (US)

(72) Inventors: Sergio Varga, Campinas-SP (BR); Jørgen E. Borup, Rungsted Kyst (DK); Thiago Cesar Rotta, Campinas-SP (BR); Marco Aurelio Stelmar Netto, São Paulo (BR); Kris Blöndal, Fornebu (NO)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/032,893

(22) Filed: Jul. 11, 2018

(65) Prior Publication Data

US 2020/0019713 A1      Jan. 16, 2020

(51) Int. Cl.
*G06F 21/60* (2013.01)
*G06F 9/50* (2006.01)
(Continued)

(52) U.S. Cl.
CPC .............. *G06F 21/60* (2013.01); *G06F 9/505* (2013.01); *G06F 9/542* (2013.01); *G06F 21/30* (2013.01); *H04W 4/02* (2013.01); *H04W 4/50* (2018.02)

(58) Field of Classification Search
None
See application file for complete search history.

(56) References Cited

U.S. PATENT DOCUMENTS

| 7,681,032 B2 | 3/2010 | Peled |
| 9,229,777 B2 * | 1/2016 | Boss ...................... G06F 9/505 |

(Continued)

FOREIGN PATENT DOCUMENTS

| CN | 104253870 A | 12/2014 |
| CN | 105657009 A | 6/2016 |

(Continued)

OTHER PUBLICATIONS

Gregory, A., "Breaking Down Micro-segmentation," [online] OneNeck IT Solutions LLC © 2018, May 25, 2017, retrieved from the Internet: <https://www.oneneck.com/blog/breaking-down-micro-segmentation>, 7 pg.

(Continued)

*Primary Examiner* — Joshua Joo
(74) *Attorney, Agent, or Firm* — Cuenot, Forsythe & Kim, LLC

(57) ABSTRACT

Data privacy information pertaining to particular data hosted by a first workload provisioned to a first location can be received. The first workload can be monitored to determine whether the first workload is accessed by a second workload, determine whether the second workload is indicated as being authorized, in the data privacy information, to access the particular data hosted by first workload, and determine whether the second workload has access to the particular data hosted by the first workload. If so, the first workload can be automatically provisioned to a second location to which provisioning of the first workload is allowed based on the data privacy information.

20 Claims, 6 Drawing Sheets

(51) Int. Cl.
    *G06F 21/30*     (2013.01)
    *G06F 9/54*     (2006.01)
    *H04W 4/50*     (2018.01)
    *H04W 4/02*     (2018.01)

(56) References Cited

U.S. PATENT DOCUMENTS

| | | |
|---|---|---|
| 9,300,691 B1 | 3/2016 | Banerjee |
| 9,432,350 B2 | 8/2016 | Anderson et al. |
| 9,467,476 B1 | 10/2016 | Shieh et al. |
| 9,609,026 B2 | 3/2017 | Ross et al. |
| 2003/0140082 A1* | 7/2003 | Hase .................. G06F 8/656 718/102 |
| 2005/0065823 A1 | 3/2005 | Ramraj et al. |
| 2010/0057720 A1 | 3/2010 | Kalyan |
| 2012/0005720 A1 | 1/2012 | McGloin et al. |
| 2012/0110680 A1 | 5/2012 | Oliver et al. |
| 2012/0185913 A1 | 7/2012 | Martinez et al. |
| 2012/0290292 A1 | 11/2012 | Liu et al. |
| 2012/0297441 A1 | 11/2012 | Boldyrev et al. |
| 2014/0053238 A1 | 2/2014 | Brannon |
| 2014/0115712 A1 | 4/2014 | Powell et al. |
| 2014/0289875 A1 | 9/2014 | Knafel |
| 2016/0056993 A1* | 2/2016 | Harishankar ......... H04L 41/069 709/224 |
| 2016/0057115 A1 | 2/2016 | Abuelsaad et al. |
| 2016/0253216 A1 | 9/2016 | Greenberger |
| 2016/0301707 A1 | 10/2016 | Cheng |
| 2017/0041264 A1 | 2/2017 | Khomami Abadi |
| 2017/0091473 A1* | 3/2017 | Agarwal ............... G06F 21/606 |
| 2017/0177884 A1 | 6/2017 | Mehta et al. |
| 2018/0102902 A1* | 4/2018 | Yang .................... G06F 21/602 |
| 2018/0107569 A1* | 4/2018 | Bower, III .......... G06F 11/2007 |
| 2018/0176206 A1* | 6/2018 | Matthews ............. H04L 63/083 |
| 2018/0293400 A1 | 10/2018 | Varga et al. |

FOREIGN PATENT DOCUMENTS

| | | |
|---|---|---|
| WO | 2004047398 A1 | 6/2004 |
| WO | 2006069866 A1 | 7/2006 |

OTHER PUBLICATIONS

"Protecting Data in Microsoft Asure," [online] Microsoft Corporation © 2014, Aug. 2014, retrieved from the Internet: <download.microsoft.com/download/0/.../microsoftazuredataprotection_aug2014.pdf>, 39 pg.

Mell, P. et al., "The NIST definition of cloud computing," National Institute of Standards and Technology, U.S. Dept. of Commerce, Special Publication 800-145, Sep. 2011, 7 pg.

IBM: List of IBM Patents or Patent Applications Treated as Related, 2 pg.

Varga et al., "System to Prevent Export of Sensitive Data", U.S. Appl. No. 15/481,833, filed Apr. 7, 2017, 35 pages.

PCT Appln. PCT/IB2019/055079, International Search Report and Written Opinion, dated Oct. 12, 2019, 9 pg.

\* cited by examiner

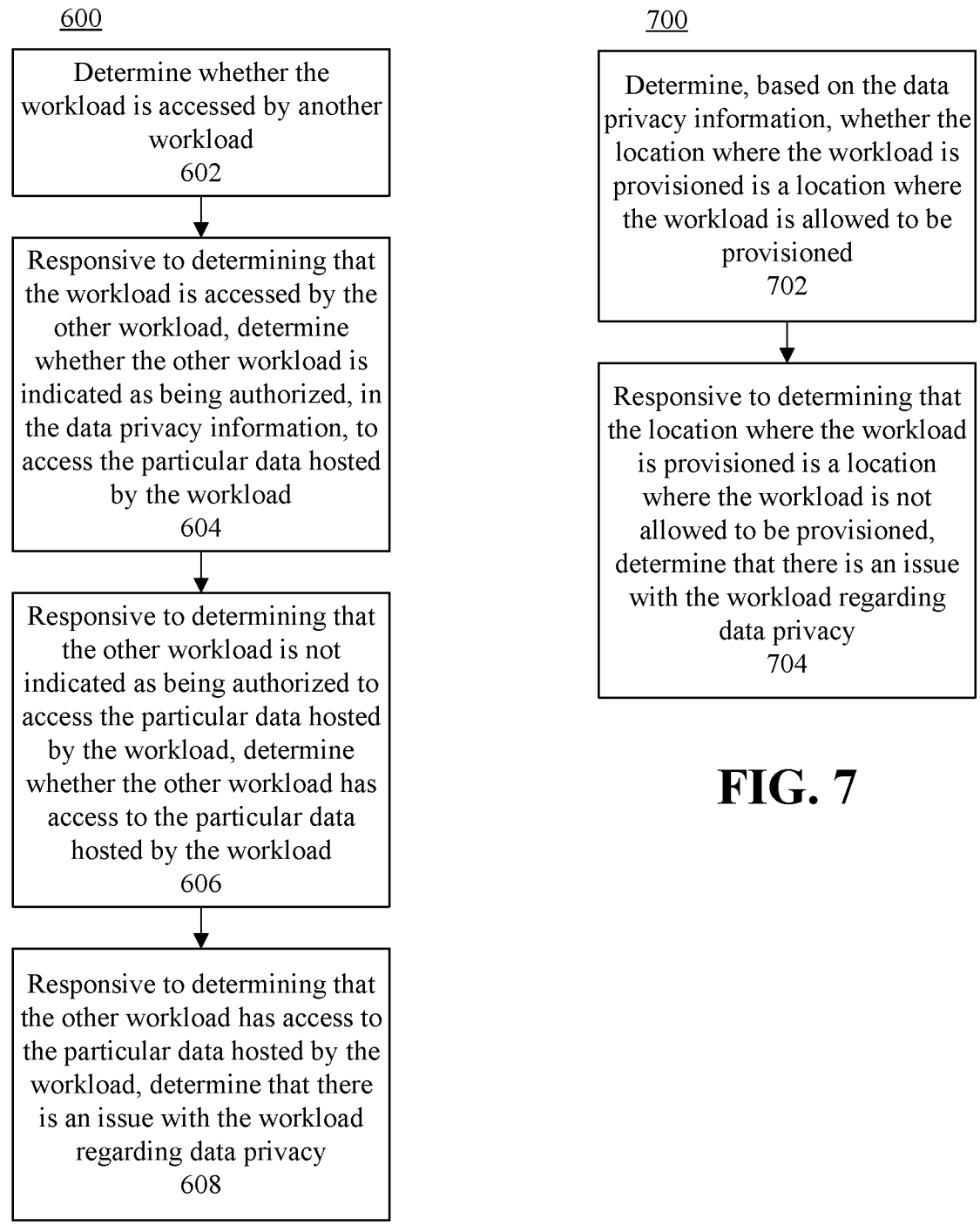

DATA PRIVACY AWARENESS IN WORKLOAD PROVISIONING

BACKGROUND

The present invention relates to data processing, and more specifically, to provisioning workloads in a distributed computing environment.

Data privacy is an issue that concerns most information technology (IT) organizations. Several organizations have data privacy requirements due to contractual obligations. Moreover, several countries mandate data privacy requirements based on laws and regulations. With the continued increase in globalization of IT assets, however, organizations are increasingly deploying data out of their home territories. Securely managing such data presents certain challenges.

SUMMARY

A method can include receiving data privacy information pertaining to particular data hosted by a first workload provisioned to a first location. The method also can include monitoring the first workload. Monitoring the first workload can include: determining whether the first workload is accessed by a second workload; responsive to determining that the first workload is accessed by the second workload, determining whether the second workload is indicated as being authorized, in the data privacy information, to access the particular data hosted by first workload; and, responsive to determining that the second workload is not indicated as being authorized to access the particular data hosted by the first workload, determining whether the second workload has access to the particular data hosted by the first workload. The method also can include, responsive to determining that the second workload has access to the particular data hosted by the first workload, automatically provisioning, using a processor, the first workload to a second location to which provisioning of the first workload is allowed based on the data privacy information.

A system includes a processor programmed to initiate executable operations. The executable operations can include receiving data privacy information pertaining to particular data hosted by a first workload provisioned to a first location. The executable operations also can include monitoring the first workload. Monitoring the first workload can include: determining whether the first workload is accessed by a second workload; responsive to determining that the first workload is accessed by the second workload, determining whether the second workload is indicated as being authorized, in the data privacy information, to access the particular data hosted by first workload; and, responsive to determining that the second workload is not indicated as being authorized to access the particular data hosted by the first workload, determining whether the second workload has access to the particular data hosted by the first workload. The executable operations also can include, responsive to determining that the second workload has access to the particular data hosted by the first workload, automatically provisioning the first workload to a second location to which provisioning of the first workload is allowed based on the data privacy information.

A computer program product includes a computer readable storage medium having program code stored thereon. The program code is executable by a data processing system to initiate operations. The operations include can include receiving data privacy information pertaining to particular data hosted by a first workload provisioned to a first location. The operations also can include monitoring the first workload. Monitoring the first workload can include: determining whether the first workload is accessed by a second workload; responsive to determining that the first workload is accessed by the second workload, determining whether the second workload is indicated as being authorized, in the data privacy information, to access the particular data hosted by first workload; and, responsive to determining that the second workload is not indicated as being authorized to access the particular data hosted by the first workload, determining whether the second workload has access to the particular data hosted by the first workload. The operations also can include, responsive to determining that the second workload has access to the particular data hosted by the first workload, automatically provisioning the first workload to a second location to which provisioning of the first workload is allowed based on the data privacy information.

BRIEF DESCRIPTION OF THE DRAWINGS

FIG. 6 is a flowchart illustrating an example of a method of monitoring a workload to determine whether there is an issue with the workload regarding data privacy.

FIG. 7 is a flowchart illustrating another example of a method of monitoring a workload to determine whether there is an issue with the workload regarding data privacy.

DETAILED DESCRIPTION

Figure 1:
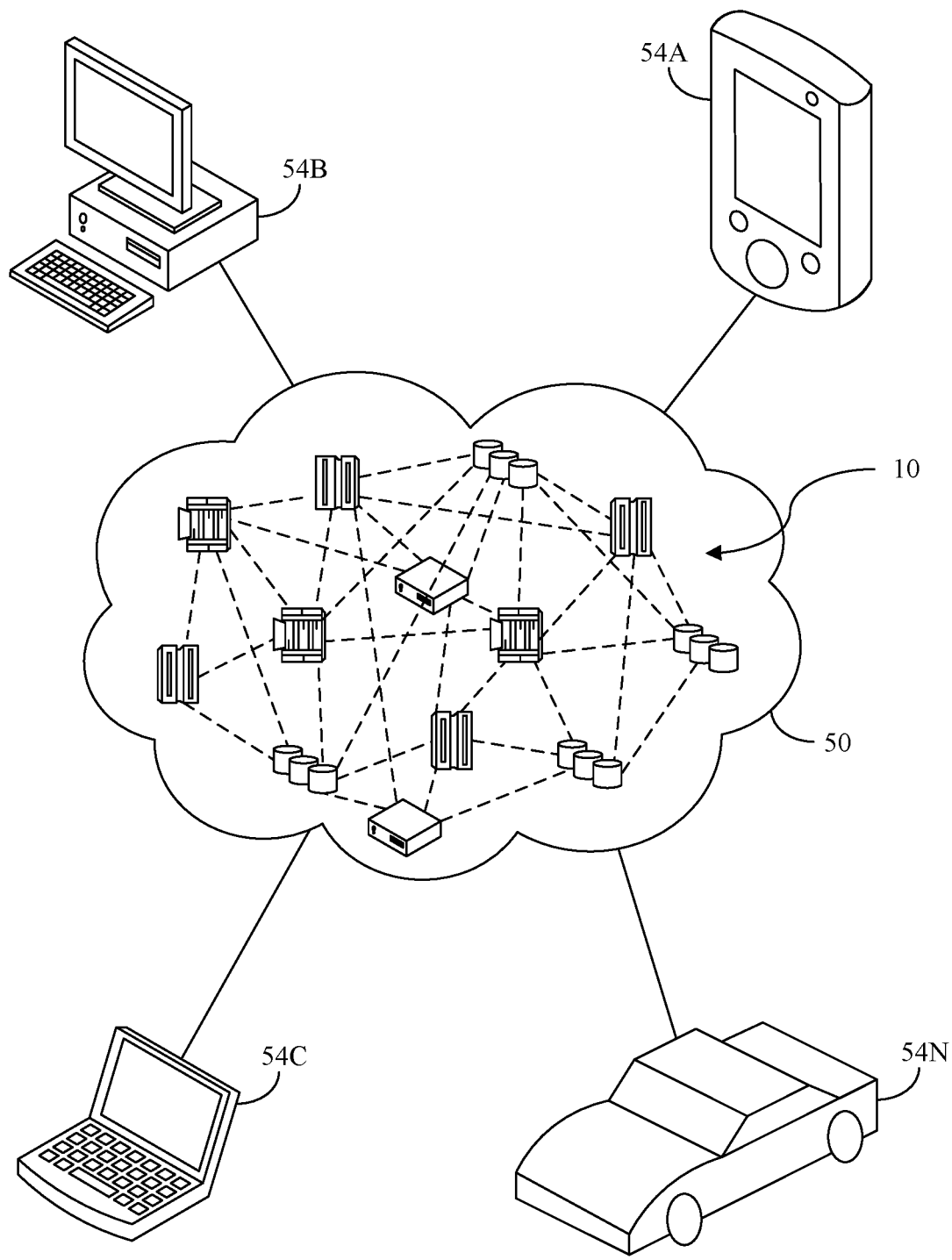
FIG. 1 depicts a cloud computing environment according to an embodiment of the present invention.

This disclosure relates to data processing, and more specifically, to provisioning workloads in a distributed computing environment.

Provisioning, orchestrator and broker services that manage workloads generally do not have the capability to identify when a workload is handling sensitive data that it is not in accordance with a contract, law, or regulation. This can result in high risks to organizations responsible for managing these workloads, including incurring penalties and fines. The arrangements described herein mitigate such risks.

In accordance with the inventive arrangements disclosed herein, workloads that host sensitive data can be provisioned to locations that not only have capacity to execute the workloads, but that also satisfy requirements of data privacy policies for hosting the data. In this regard, data privacy information pertain to the data can be processed to identify locations that satisfy the requirements of data privacy policies, and that have capacity to meet workload specifications specified for the workloads. Thus, the present arrangements provide processes that are proactive in provisioning workloads in a manner complying with the data privacy policies.

A user may move a workload from a present location to a new location for some reason. That user may not be fully aware of the data privacy policies. Nonetheless, in accordance with the present arrangements, workloads also can be monitored to determine whether there are issues with the workloads regarding data privacy. Further, workloads that were not originally provisioned using processes describe herein can be monitored to determine whether there are issues with the workloads regarding data privacy. If there are any such issues, the workloads can be automatically moved, in real time, to locations allowed to host the workloads based on the data privacy policies. Such locations can satisfy the data privacy policies, thus mitigating violation of the data privacy policy. Also, notifications indicating the issues can be automatically generated and communicated to proper people, for example system or compliance administrators. Having such information, the system or compliance administrators can take steps to mitigate risk of the issues again occurring.

Several definitions that apply throughout this document now will be presented.

As defined herein, the term "workload" means an amount of work (e.g., processing and/or storage operations) performed by a device or system.

As defined herein, the term "provision a workload" means to provide hardware and software resources for processing a workload and assign the workload to those hardware and software resources.

As defined herein, the term "location" means a geographic location. A geographic location may be indicated by a street address, a building name, a name of a city, a name of a county, a name of a state or province, a name of a country, a postal code, global positioning system (GPS) coordinates, and/or may be indicated in any other suitable manner.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
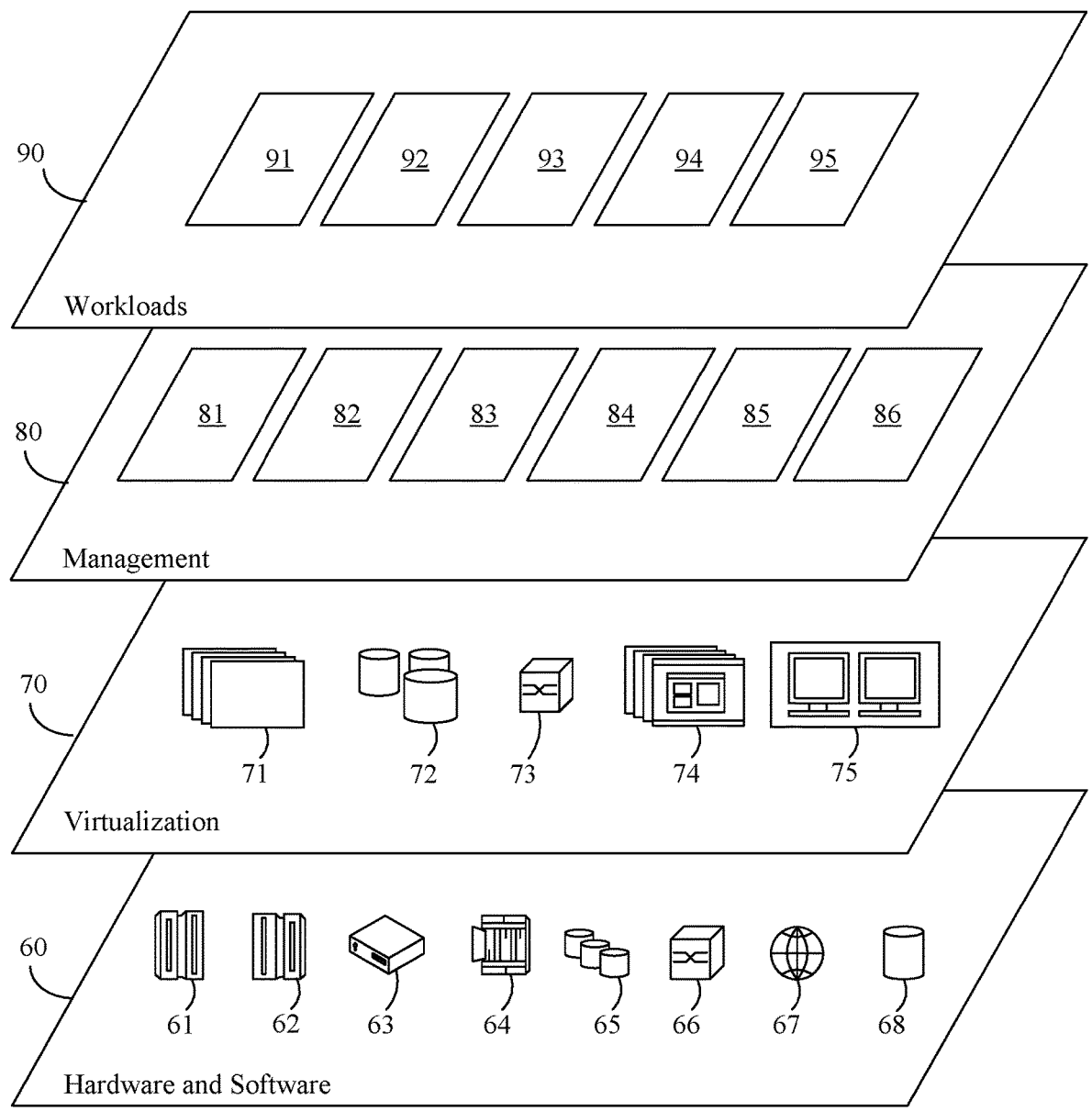
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Security 86 provides identity verification for cloud consumers and tasks, as well as protection for data and other resources, including data privacy awareness and protection.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
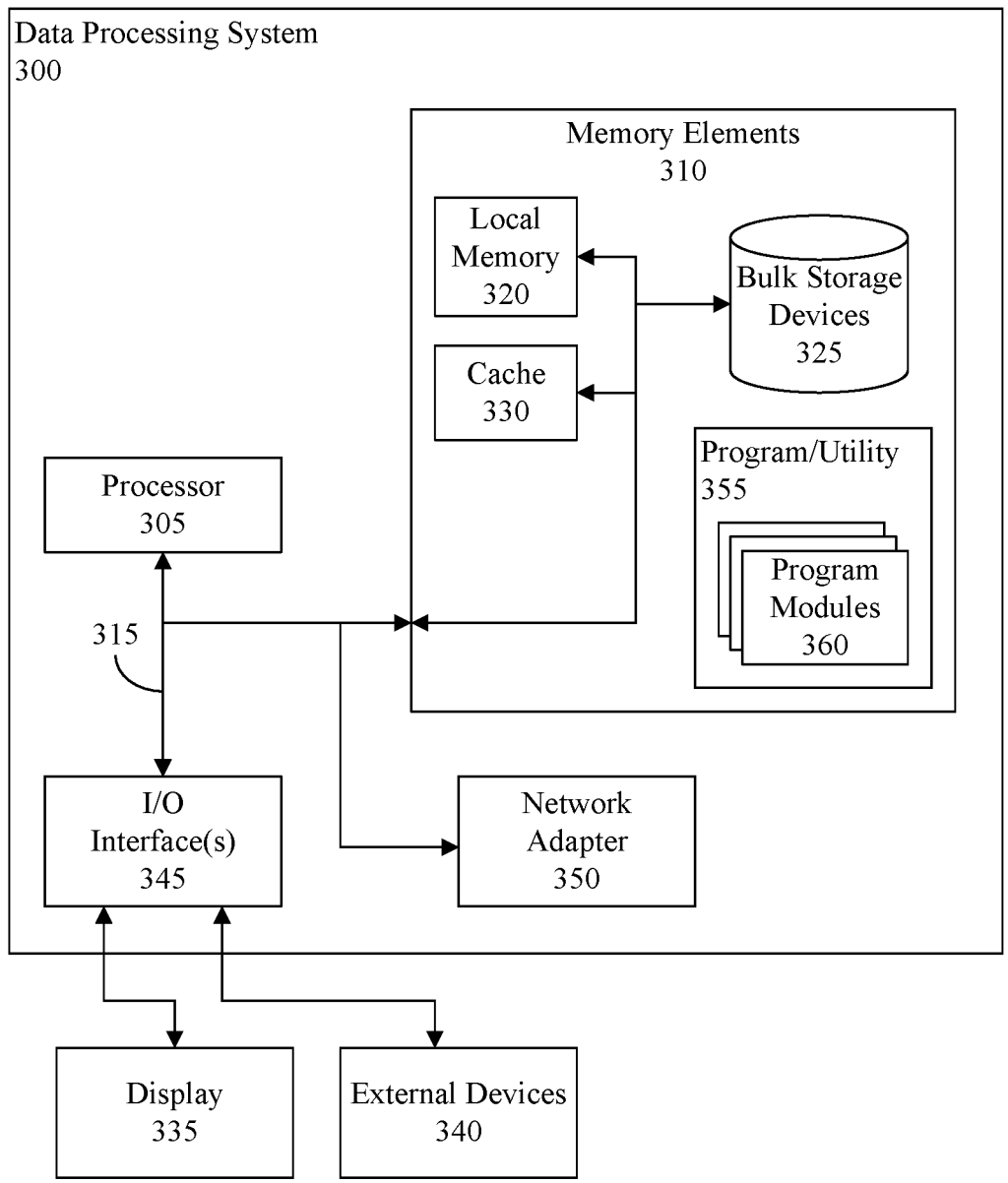
FIG. 3 is a block diagram illustrating example architecture for a data processing system.

FIG. 3 is a block diagram illustrating example architecture for a data processing system 300. Data processing system 300 may be deployed in cloud computing environment of FIG. 1, for example in hardware and software layer 60 of FIG. 2. By way of example, data processing system 300 may be implemented as a RISC based server 62, server 63 or blade server 64.

Data processing system 300 can include at least one processor 305 (e.g., a central processing unit) coupled to memory elements 310 through a system bus 315 or other suitable circuitry. As such, data processing system 300 can store program code within memory elements 310. Processor 305 can execute the program code accessed from memory elements 310 via system bus 315. It should be appreciated that data processing system 300 can be implemented in the form of any system including a processor and memory that is capable of performing the functions and/or operations described within this specification.

Memory elements 310 can include one or more computer readable storage mediums. Computer readable storage mediums can be physical memory devices such as, for example, local memory 320 and one or more bulk storage devices 325. Local memory 320 refers to random access memory (RAM) or other non-persistent memory device(s) generally used during actual execution of the program code. Bulk storage device(s) 325 can be implemented as a hard disk drive (HDD), solid state drive (SSD), or other persistent data storage device. Bulk storage device(s) 325 can be maintained by a storage system of data processing system 300. Bulk storage devices 325 also can be external to data processing system, for example as components of a storage system communicatively linked to data processing system 300. Memory elements 310 also can include one or more cache memories 330 that provide temporary storage of at least some program code in order to reduce the number of times program code must be retrieved from the bulk storage device(s) 325 during execution.

Input/output (I/O) devices such as a display 335 and other external devices 340 (e.g., a pointing device, a keyboard, etc.) can be coupled to the data processing system 300. The I/O devices can be coupled to the data processing system 300 either directly or through intervening I/O interface(s) 345. For example, the display 335 can be coupled to the data processing system 300 via a graphics processing unit (GPU), which may be a component of the processor 305 or a discrete device. One or more network adapters 350 also can be coupled to data processing system 300 to enable data processing system 300 to become coupled to other systems, computer systems, remote printers, and/or remote storage devices through intervening private or public networks. Modems, cable modems, transceivers, and Ethernet cards are examples of different types of network adapters 350 that can be used with the data processing system 300.

As pictured in FIG. 3, memory elements 310 can store the components of the data processing system 300, for example at least one computer program or utility (hereinafter "program/utility") 355 including one or more computer program modules 360 configured to carry out the processes and/or methodologies of the embodiments described herein. The program/utility 355 can be a component of management layer 80 of FIG. 2, for example to provide security 86. Being implemented in the form of executable program code, the program/utility 355 can be executed by the data processing system 300 and, as such, can be considered part of the data processing system 300. Moreover, the program/utility 355 includes functional data structures (e.g., computer program modules 360) that impart functionality when employed as part of the data processing system 300.

Figure 4:
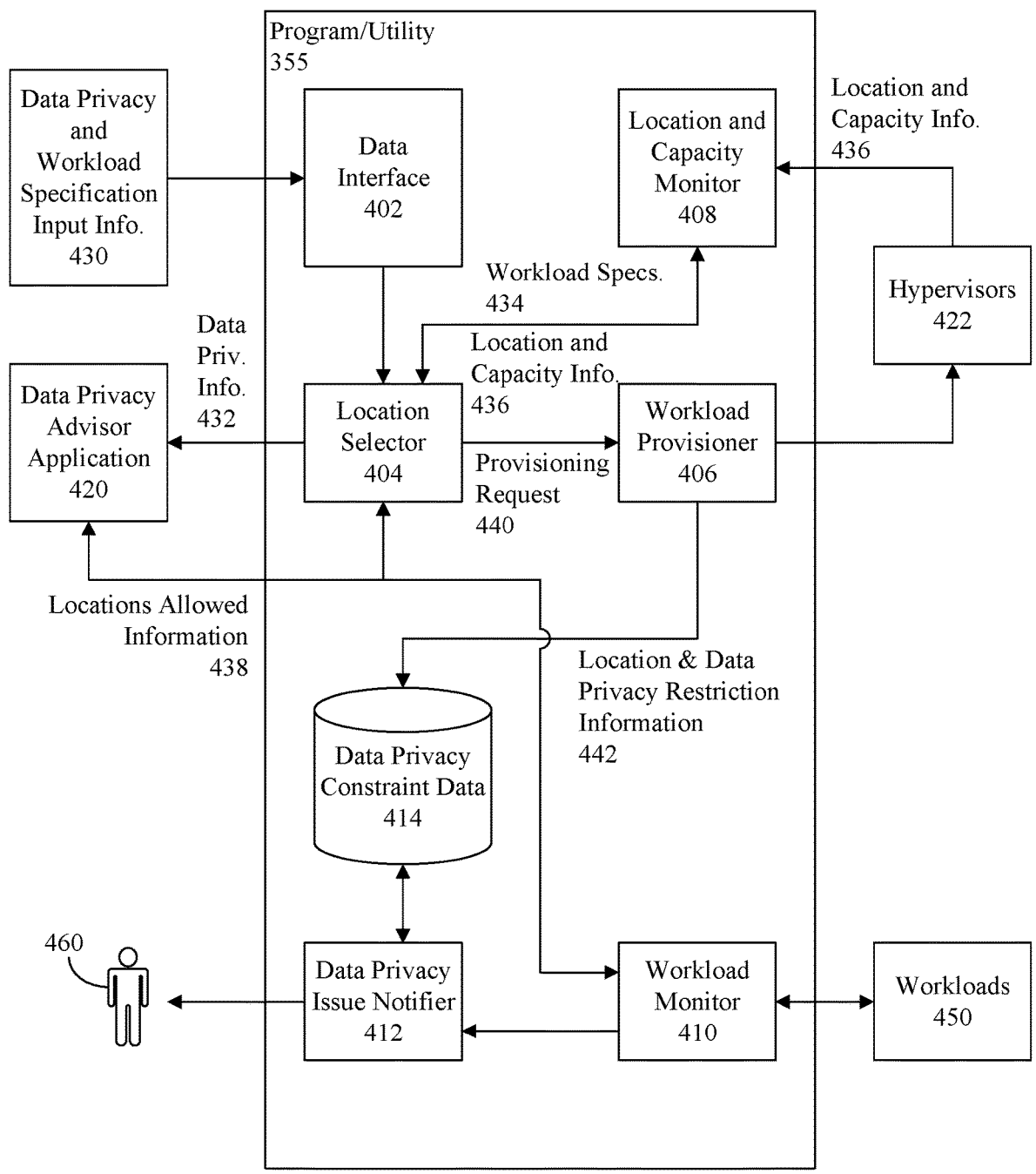
FIG. 4 depicts example architecture for a security application.

FIG. 4 depicts example architecture 400 for a program/utility 355 that provides security 86 (FIG. 2), including data privacy awareness and protection. As noted, the program/utility 355 can include computer program modules 360, for example a data interface 402, a location selector 404, a workload provisioner 406, a location and capacity monitor 408, a workload monitor 410, a data privacy issue notifier 412 and data privacy constraint data 414.

The architecture 400 further can include a data privacy advisor application 420 and hypervisors 422. The hypervisors 422 (also known in the art as virtual machine monitors) are computer software, firmware or hardware that create and run virtual machines. A data processing system on which a hypervisor runs one or more virtual machines is called a host machine, and each virtual machine is called a guest machine. The program/utility 355 can execute on a guest machine, though the present arrangements are not limited in this regard. The program/utility 355 can communicate with host machines on which the program/utility 355 is not executing via one or more communication networks.

In a one arrangement, the data privacy advisor application 420 can be a component of the program/utility 355. In other arrangements, the data privacy advisor application 420 can be external to the program/utility 355, but the program/utility 355 can be communicatively linked to the data privacy advisor application 420, for example via one or more communication networks or system busses. For example, the data privacy advisor application 420 can execute on the same data processing system on which the program/utility 355 is executing (e.g., on the same guest machine or a different guest machine), or one or more data processing systems that are different than the data processing system on which the program/utility 355 is executed.

The data interface 402 configured to receive data privacy and workload specification input information 430. In one arrangement, the data interface 402 can be, for example, a user interface (e.g., a graphical user interface) via which a user interacts to enter the data privacy and workload specification input information 430. In another arrangement, the data interface 402 can be an interface configured to access the data privacy and workload specification input information 430 from one or more data sources, for example from one or more data tables and/or one or more data files. The data privacy and workload specification input information 430 can include data privacy information 432 and workload specifications 434.

The data privacy information 432 can include attributes indicating data privacy requirements for data to be processed by workloads provisioned by the program/utility 355. In illustration, the data privacy information 432 can specify data privacy classifications for the data, for example using labels, annotations and/or metadata. Examples of privacy classifications include, but are not limited to, "sensitive data", "non-sensitive data", "classified data", "confidential data", "personal data", "sensitive technology" or more low level such as "passport data", "social security number data", "mailing address data", "account number data", "email address data", "phone number data", "password data", "logon data", etc.

The workload specifications 434 can include attributes indicating requirements for systems to which the workloads that host the data may be provisioned. In illustration, the workload specifications 434 can indicate hardware and/or software resources to be used to provision the workload. In one arrangement, the workload specifications 434 can include attributes specifying the required hardware and/or software resources. For example, a user may input the hardware and/or software resource requirements. In another arrangement, the workload specifications 434 can include an attribute specifying an SLA applicable to the workload and/or data. In such an arrangement, the location selector 404 can identify the SLA specified in the workload specifications 434, access the SLA from a suitable data storage location, and identify the applicable requirements for the hardware and/or software resources in the SLA.

Examples of hardware resource requirements include, but are not limited to, a number of processors, a number of processor cores, a minimum processor frequency, a minimum number of instructions per clock cycle, a minimum number of operations per second, an amount of local memory, an amount of bulk storage, an amount of cache memory, and so on. Examples of software resource requirements include a type of operating system, a particular operating system, a particular version of an operating system, one or more required programs (e.g., applications) and/or utilities, required versions of one or more required programs and/or utilities, etc.

Responsive to receiving data privacy information and workload specification input information 430, the location selector 404 can communicate to the location and capacity monitor 408 a request indicating the workload specifications 434. Responsive to the request, the location and capacity monitor 408 can communicate with the hypervisors 422 to monitor or capture location and capacity information 436 indicating locations of the hypervisors 422 and available workload capacity of systems (e.g., data processing systems and/or storage systems), on which the hypervisors 422 run, which satisfy the workload specifications 434. The location and capacity information 436 also can indicate the types of workloads that may be deployed to the systems. The location and capacity monitor 408 can communicate the location and capacity information 436 to the location selector 404.

The location selector 404 also can communicate to the data privacy advisor application 420 the data privacy information 432. The data privacy advisor application 420 can analyze the data privacy information 432 and, based on such analysis, determine locations to which workloads that will process and/or store the data may be provisioned. The analysis can include accessing data privacy policies and applying the data privacy policies to the data privacy information 432.

The data privacy policies can be based on data privacy laws, data privacy regulations and/or other data privacy rules that may be established. The data privacy policies can specify what classifications of data can and cannot be transferred from a given source to various locations to which workloads may be provisioned. For example, for a particular location, the data privacy policies can specify classes of data from various sources allowed to be hosted by workloads provisioned at that location, and specify classes of data from various sources that are not allowed to be hosted by workloads provisioned at that location. In illustration, the data policies may indicate that data labeled as "classified data" may only be hosted by workloads provisioned in certain countries and/or provisioned in data centers meeting certain security requirements. The data policies also may indicate that data labeled as "personal data" may only be hosted by workloads provisioned in data centers meeting certain security requirements. Further, the data policies may indicate that data labeled as "non-sensitive" data may be hosted by workloads provisioned in data centers meeting a minimum level of security requirements. The present arrangements, however, are not limited to these examples.

The data privacy policies can be maintained by a policies system (not shown) that applies a machine learning model to statistically parse policy documents to generate structured data and populate a relational knowledge database based on predefined schema defined as important portions/elements of the unstructured data that need to be considered further in the process to allow or deny an action based on the policies. In the policies system, a plurality of documents in natural language may be analyzed to find elements to construct the predefined knowledge database with the rules of what type of data can and cannot be transferred from a given source to a destination. The database can hold the entities or elements that are an important part of what policy documents mention about data or information that can or cannot be digitally transferred. The database can be accessed by a variety of means and may also be updated manually in case of minor changes on policies in which the documents have not been processed. Further, the database can be created with joint efforts with governments to enforce cyber security.

Based on the determined locations, the data privacy advisor application 420 can generate locations allowed information 438 indicating the locations determined to satisfy the requirements of the data privacy policies for hosting the data. The data privacy advisor application 420 can communicate the locations allowed information 438 to the location selector 404. The data privacy advisor application 420 or the location selector 404 can communicate the locations allowed information to the workload monitor 410. From the locations allowed information 438, the location selector 404 can identify, as candidate locations, locations where provisioning of the workload to host the data is allowed.

Based on the locations allowed information 438 and the location and capacity information 436, the location selector 404 can automatically select, from the candidate locations, at least one location to which to provision workloads to host the data. A selected location can be a location indicated in the locations allowed information 438, which is determined, based on the location and capacity information 436, to satisfy the requirements of the data privacy policies for hosting the data, and which has at least one system (e.g., data processing system and/or storage system) that has available capacity to execute the workload(s) while satisfying the workload specifications 434. The location selector 404 can communicate to the workload provisioner 406 a provisioning request 440 identifying the selected location(s) and requesting one or more workload(s) be provisioned at the selected location(s). For example, the provisioning request 440 can indicate one or more hypervisors 422 at the selected location(s) that are to provision the workload.

In response to the provisioning request 440, the workload provisioner 406 can automatically provision the workload(s) to one or more systems at the selected location(s). For example, the workload provisioner 406 can communicate to the hypervisor(s) 422 information pertaining to the workload(s) being provisioned. In response, the hypervisor(s) 422 can automatically create one or more workloads for hosting the data. For example, the hypervisor(s) 422 can create one or more virtual machines (e.g., guest machines), microservices and/or containers for the workload(s). The workload provisioner 406 also can store location and data privacy restriction information 442 pertaining to the workload to a database, for example as data privacy constraint data 414. The database can be internal to the program/utility 355, though this need not be the case.

In addition to provisioning workloads, the program/utility 355 (e.g., the workload monitor 410) also can monitor the workloads to ensure that the workloads are maintained in accordance with the data privacy policies during the lifecycles of the workloads. In illustration, workloads 450 can represent workloads that have been provisioned. As noted, the workload monitor 410 can receive the locations allowed information 438 for the workloads 450 from the data privacy advisor application 420, and periodically can request from the data privacy advisor application 420 updates to the locations allowed information 438. Further, the workload monitor 410 can receive from the location selector 404 and/or the data privacy advisor application 420 the data privacy information 432, and periodically can request updates to such information.

During the workload monitoring process, for each workload 450, the workload monitor 410 can determine whether there is an issue with the workload 450 regarding data privacy. For example, the workload monitor 410 can determine whether the required data privacy policies are being complied with according to predetermined criteria indicated in the data privacy information 432 and/or indicated in the data privacy policies applicable to the data based on the data privacy information 432.

In illustration, the workload monitor 410 also can determine whether the workload 450 is accessed by another workload and, if so, whether such other workload is indicated as being authorized, in the data privacy information 432, to access the particular data (e.g., sensitive data) hosted by workload. Responsive to determining that the other workload is not authorized to access the particular data hosted by workload 450, the workload monitor 410 can determine whether the other workload has access to the particular data hosted by the workload 450. The workload monitor 410 can do so by checking protocols implemented to access the workload 450, identifying open data base connectivity (ODBC) calls to the workload 450, identifying queries to the workload 450, identifying marketing tools accessing the workload 450, etc. If the other workload has access to the particular data hosted by the workload 450, and is not authorized to have such access, the workload monitor 410 can determine that there is an issue with the workload 450 regarding data privacy.

In response to determining that there is an issue with the workload 450 regarding data privacy based on the access to the particular data by the other workload, the workload monitor 410 can store information about the workload 450, including information identifying the other workload that has access to the workload 450, the manner in which the other workload accessed the particular data hosted by the workload 450, etc. The workload monitor 410 can store the information to a suitable data storage, for example a database resident in the program/utility 355. The workload monitor 410 further can initiate the data privacy issue notifier 412 to automatically communicate a notification (e.g., an alert, a text message, an e-mail, etc.) to the system or compliance administrator 460 indicating that the workload 450 has been accessed by an unauthorized workload, and include in the notification the information about the other workload, the manner in which the other workload accessed the particular data hosted by the workload 450, etc. Also, the workload monitor 410 can communicate, in real time, a request to the location selector 404 to select a new location to where the workload 450 is to be provisioned. In response, the program/utility 355 can perform the above described processes, in real time, to automatically provision the workload 450 to a new location where the workload 450 is allowed to be provisioned.

Further, the workload monitor 410 can determine whether the workload 450 continues to be provisioned in the allowed location(s). In illustration, the workload monitor 410 can determine whether a workload 450 currently is provisioned to a location that is not an allowed location indicated in the locations allowed information 438. For example, the workload 450 may have been moved from its original location, or the monitoring process may have been started after the workload 450 already was deployed. In the case that the monitoring process was started after the workload 450 already was deployed, the data privacy and workload specification input information 430 can be received by the data interface 402 for the workload 450, and the location selector 404 and data privacy advisor application 420 can perform the previously described processes to generate the locations allowed information 438, which the data privacy advisor application 420 or location selector 404 can communicate to the workload monitor 410. Nonetheless, responsive to determining that the workload 450 currently is provisioned to a location that is not an allowed location indicated in the locations allowed information 438, the workload monitor 410 can determine that there is an issue with the workload 450 regarding data privacy.

In response to determining that there is an issue with the workload 450 regarding data privacy based on the workload 450 not being provisioned in the allowed location(s), the workload monitor 410 can store information about the workload 450, including information indicating the location where the workload 450 is provisioned, information indicating violations of the data privacy information 432, etc.

The workload monitor 410 can store the information to a suitable data storage, for example a database resident in the program/utility 355. Further, the workload monitor 410 can initiate the data privacy issue notifier 412 to automatically communicate a notification (e.g., an alert, a text message, an e-mail, etc.) to a system or compliance administrator 460 indicating that the workload 450 has been provisioned to a location that is not a location where the workload is allowed to be provisioned, and include in the notification the information indicating the location where the workload 450 is provisioned, the information indicating violations of the data privacy information 432, etc. Also, the workload monitor 410 can communicate, in real time, a request to the location selector 404 to select a new location to where the workload 450 is to be provisioned. In response, the program/utility 355 can perform the above described processes, in real time, to provision the workload 450 to a new location where the workload 450 is allowed to be provisioned.

Figure 5:
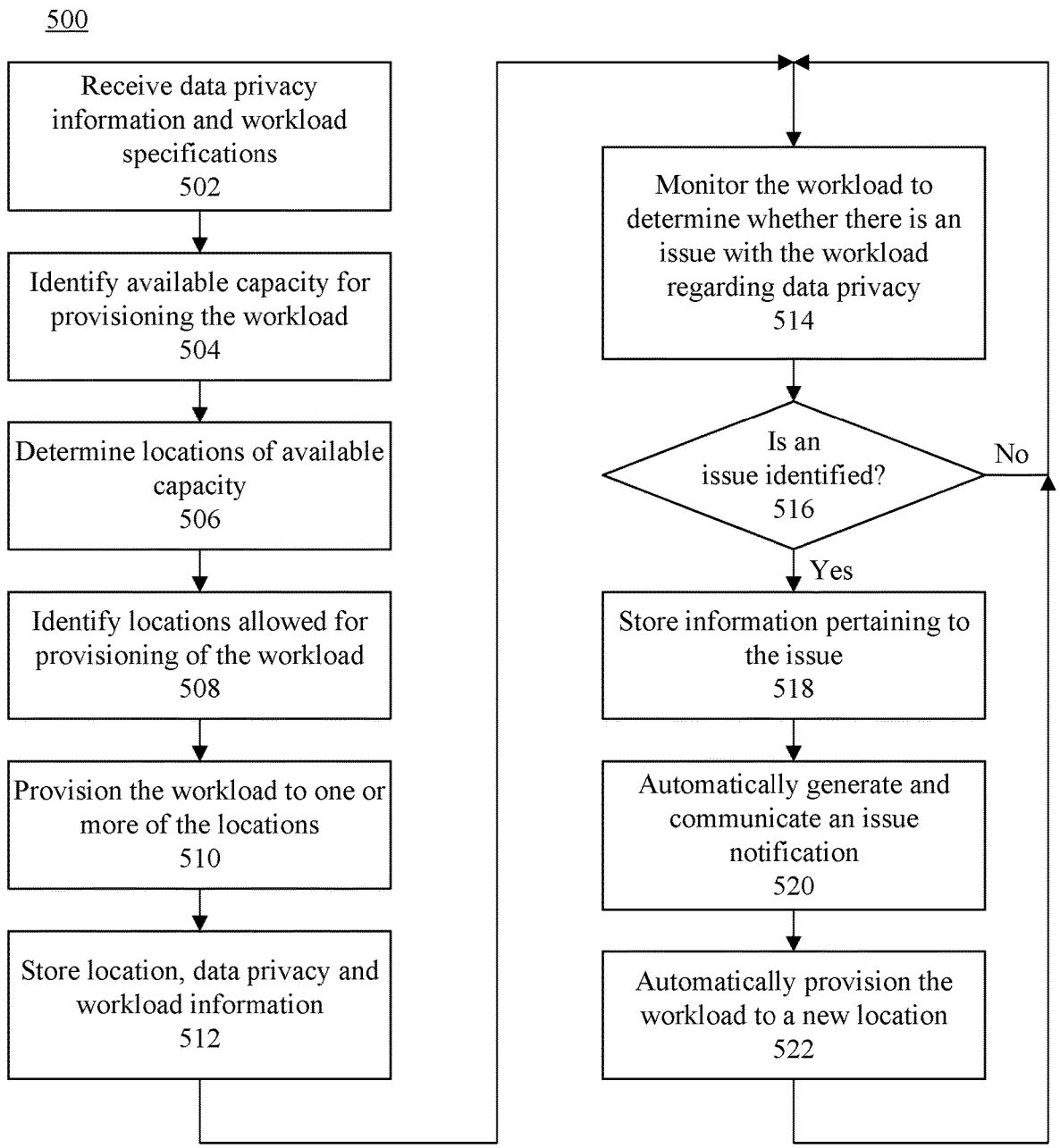
FIG. 5 is a flowchart illustrating an example of a method of providing data privacy awareness and protection.

FIG. 5 is a flowchart illustrating an example of a method 500 of providing data privacy awareness and protection. At step 502, the program/utility 355 can receive data privacy information pertaining to particular data to be hosted by a workload. The program/utility 355 also can receive workload specifications for the workload.

At step 504, the program/utility 355 can identify available capacity for provisioning the workload. For example, the program/utility 355 can identify hypervisors that run on systems having the available capacity and which satisfy the workload specifications. At step 506, the program/utility 355 can determine locations of available capacity. For example, the program/utility 355 can identify the locations of the hypervisors that run on systems having available capacity and which satisfy the workload specifications.

At step 508, the program/utility 355 can identify locations allowed for provisioning of the workload. For example, the program/utility 355 can interface with the data privacy advisor application 420 to identify as candidate locations those locations that are allowed for provisioning of the workload. At step 510, the program/utility 355 can provision the workload to one or more of the identified locations which have available capacity. For example, the program/utility 355 can determine which of the candidate locations are locations that have available capacity for provisioning the workload while satisfying the workload specifications, and select one or more of those locations.

At step 512, the program/utility 355 can store location, data privacy and workload information. For example, the program/utility 355 can store such information as data privacy constraint data. At step 514, the program/utility 355 can monitor the workload to determine whether there is an issue with the workload regarding data privacy.

FIG. 6 is a flowchart illustrating an example of a method 600 of monitoring a workload to determine whether there is an issue with the workload regarding data privacy. At step 602, the program/utility 355 can determine whether the workload is accessed by another workload. At step 604, responsive to determining that the workload is accessed by the other workload, the program/utility 355 can determine whether the other workload is indicated as being authorized, in the data privacy information, to access the particular data hosted by the workload. At step 606, responsive to determining that the other workload is not indicated as being authorized to access the particular data hosted by the workload, the program/utility 355 can determine whether the other workload has access to the particular data hosted by the workload. At step 608, responsive to determining that the other workload has access to the particular data hosted by the workload, the program/utility 355 can determine that there is an issue with the workload regarding data privacy.

FIG. 7 is a flowchart illustrating another example of a method 700 of monitoring a workload to determine whether there is an issue with the workload regarding data privacy.

At step 702, the program/utility 355 can determine, based on the data privacy information, whether the location where the workload is provisioned is a location where the workload is allowed to be provisioned. At step 704, responsive to determining that the location where the workload is provisioned is a location where the workload is not allowed to be provisioned, the program/utility 355 can determine that there is an issue with the workload regarding data privacy.

Returning to FIG. 5, reference is now made to decision box 516. At decision box 516, if an issue with the workload regarding data privacy is not identified, the process can return to step 514, and the program/utility 355 can continue monitoring the workload to determine whether there is an issue with the workload regarding data privacy. If, however, an issue is regarding data privacy is identified, at step 518 the program/utility 355 can store information pertaining to the issue, for example as previously described. At step 520, the program/utility 355 can automatically generate and communicate, in real time, an issue notification, for example as previously described. At step 522 the program/utility 355 can automatically provision, in real time, the workload to a new location, for example as previously described.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving data privacy information pertaining to particular data hosted by a first workload provisioned to a first location;
   monitoring the first workload, the monitoring the first workload comprising:
      determining whether the first workload is accessed by a second workload;
      responsive to determining that the first workload is accessed by the second workload, determining whether the second workload is indicated as being authorized, in the data privacy information, to access the particular data hosted by first workload; and
      responsive to determining that the second workload is not indicated as being authorized to access the particular data hosted by the first workload, determining whether the second workload has access to the particular data hosted by the first workload; and
   responsive to determining that the second workload has access to the particular data hosted by the first workload, automatically provisioning, using a processor, the first workload to a second location to which provisioning of the first workload is allowed based on the data privacy information.

2. The method of claim 1, further comprising:
   responsive to determining that the second workload has access to the particular data hosted by the first workload, storing information identifying the second workload and the manner in which the second workload accessed the particular data hosted by the first workload.

3. The method of claim 1, further comprising:
responsive to determining that the second workload has access to the data hosted by the first workload, automatically communicating a notification to a system or compliance administrator indicating that the first workload has been accessed by an unauthorized workload, the notification comprising the information identifying the second workload and the manner in which the second workload accessed the particular data hosted by the first workload.

4. The method of claim 1, wherein the monitoring the first workload further comprises:
determining, based on the data privacy information, whether the first location is a location where the workload is allowed to be provisioned;
wherein the automatically provisioning the first workload to the second location to which provisioning of the first workload is allowed further is responsive to determining that the first location is not a location where the workload is allowed to be provisioned.

5. The method of claim 4, further comprising:
automatically communicating a notification to a system or compliance administrator indicating that the first workload has been provisioned to a location that is not a location where the workload is allowed to be provisioned.

6. The method of claim 1, further comprising:
receiving workload specifications for the first workload, the workload specifications for the workload specifying resource requirements for systems to which the workload may be provisioned; and
determining that the second location has at least one system suitable to satisfy the workload specifications for the workload;
wherein the automatically provisioning the first workload to the second location further is responsive to determining that the second location has the at least one system suitable to satisfy the workload specifications for the workload.

7. The method of claim 1, further comprising:
communicating the data privacy information pertaining to the particular data to a data privacy advisor application;
responsive to the communicating the data privacy information pertaining to the particular data to the data privacy advisor application, receiving from the data privacy advisor application locations allowed information and identifying, as candidate locations, locations indicated in the locations allowed information; and
selecting the second location from the candidate locations.

8. A system, comprising:
a processor programmed to initiate executable operations comprising:
receiving data privacy information pertaining to particular data hosted by a first workload provisioned to a first location;
monitoring the first workload, the monitoring the first workload comprising:
determining whether the first workload is accessed by a second workload;
responsive to determining that the first workload is accessed by the second workload, determining whether the second workload is indicated as being authorized, in the data privacy information, to access the particular data hosted by first workload; and
responsive to determining that the second workload is not indicated as being authorized to access the particular data hosted by the first workload, determining whether the second workload has access to the particular data hosted by the first workload; and
responsive to determining that the second workload has access to the particular data hosted by the first workload, automatically provisioning the first workload to a second location to which provisioning of the first workload is allowed based on the data privacy information.

9. The system of claim 8, the executable operations further comprising:
responsive to determining that the second workload has access to the particular data hosted by the first workload, storing information identifying the second workload and the manner in which the second workload accessed the particular data hosted by the first workload.

10. The system of claim 8, the executable operations further comprising:
responsive to determining that the second workload has access to the data hosted by the first workload, automatically communicating a notification to a system or compliance administrator indicating that the first workload has been accessed by an unauthorized workload, the notification comprising the information identifying the second workload and the manner in which the second workload accessed the particular data hosted by the first workload.

11. The system of claim 8, wherein the monitoring the first workload further comprises:
determining, based on the data privacy information, whether the first location is a location where the workload is allowed to be provisioned;
wherein the automatically provisioning the first workload to the second location to which provisioning of the first workload is allowed further is responsive to determining that the first location is not a location where the workload is allowed to be provisioned.

12. The system of claim 11, the executable operations further comprising:
automatically communicating a notification to a system or compliance administrator indicating that the first workload has been provisioned to a location that is not a location where the workload is allowed to be provisioned.

13. The system of claim 8, the executable operations further comprising:
receiving workload specifications for the first workload, the workload specifications for the workload specifying resource requirements for systems to which the workload may be provisioned; and
determining that the second location has at least one system suitable to satisfy the workload specifications for the workload;
wherein the automatically provisioning the first workload to the second location further is responsive to determining that the second location has the at least one system suitable to satisfy the workload specifications for the workload.

14. The system of claim 8, the executable operations further comprising:
communicating the data privacy information pertaining to the particular data to a data privacy advisor application;
responsive to the communicating the data privacy information pertaining to the particular data to the data privacy advisor application, receiving from the data privacy advisor application locations allowed information and identifying, as candidate locations, locations indicated in the locations allowed information; and selecting the second location from the candidate locations.

15. A computer program product, comprising:

a computer readable storage medium having program code stored thereon, the program code executable by a data processing system to initiate operations including:

receiving data privacy information pertaining to particular data hosted by a first workload provisioned to a first location;

monitoring the first workload, the monitoring the first workload comprising:

determining whether the first workload is accessed by a second workload;

responsive to determining that the first workload is accessed by the second workload, determining whether the second workload is indicated as being authorized, in the data privacy information, to access the particular data hosted by first workload; and responsive to determining that the second workload is not indicated as being authorized to access the particular data hosted by the first workload, determining whether the second workload has access to the particular data hosted by the first workload; and responsive to determining that the second workload has access to the particular data hosted by the first workload, automatically provisioning the first workload to a second location to which provisioning of the first workload is allowed based on the data privacy information.

16. The computer program product of claim 15, wherein the program code is executable by the data processing system to initiate operations further comprising:

responsive to determining that the second workload has access to the particular data hosted by the first workload, storing information identifying the second workload and the manner in which the second workload accessed the particular data hosted by the first workload.

17. The computer program product of claim 15, wherein the program code is executable by the data processing system to initiate operations further comprising:

responsive to determining that the second workload has access to the data hosted by the first workload, automatically communicating a notification to a system or compliance administrator indicating that the first workload has been accessed by an unauthorized workload, the notification comprising the information identifying the second workload and the manner in which the second workload accessed the particular data hosted by the first workload.

18. The computer program product of claim 15, wherein the monitoring the first workload further comprises:

determining, based on the data privacy information, whether the first location is a location where the workload is allowed to be provisioned;

wherein the automatically provisioning the first workload to the second location to which provisioning of the first workload is allowed further is responsive to determining that the first location is not a location where the workload is allowed to be provisioned.

19. The computer program product of claim 18, wherein the program code is executable by the data processing system to initiate operations further comprising:

automatically communicating a notification to a system or compliance administrator indicating that the first workload has been provisioned to a location that is not a location where the workload is allowed to be provisioned.

20. The computer program product of claim 15, wherein the program code is executable by the data processing system to initiate operations further comprising:

receiving workload specifications for the first workload, the workload specifications for the workload specifying resource requirements for systems to which the workload may be provisioned; and determining that the second location has at least one system suitable to satisfy the workload specifications for the workload;

wherein the automatically provisioning the first workload to the second location further is responsive to determining that the second location has the at least one system suitable to satisfy the workload specifications for the workload.

* * * * *